G. C. GILLESPIE.
TOY.
APPLICATION FILED JUNE 2, 1919.
1,370,303.
Patented Mar. 1, 1921.
3 SHEETS—SHEET 1.
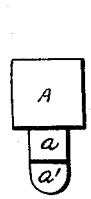
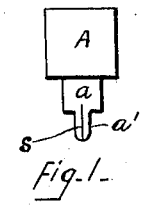
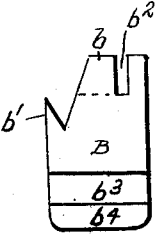
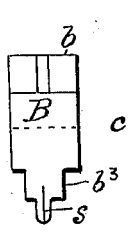
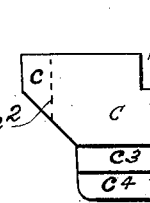
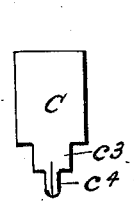
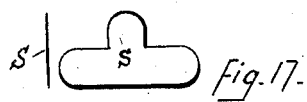
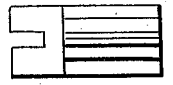
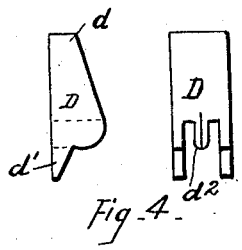
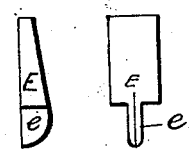
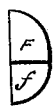
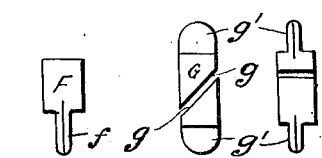
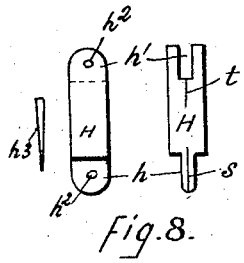
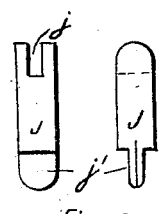
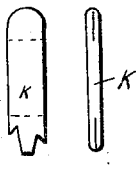
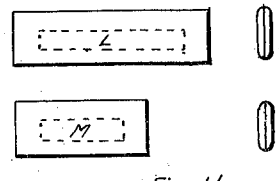
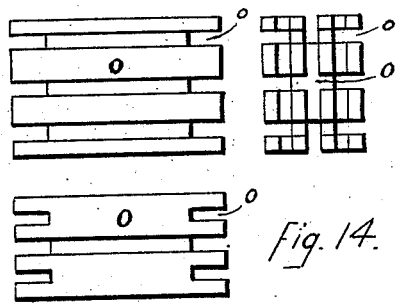
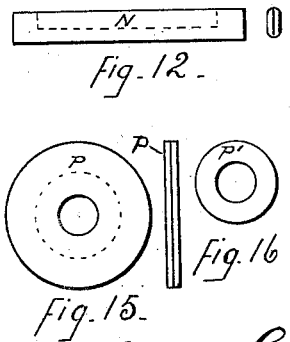
INVENTOR
George C. Gillespie
BY
ATTORNEY G. C. GILLESPIE.
TOY.
APPLICATION FILED JUNE 2, 1919.
1,370,303.
Patented Mar. 1, 1921.
3 SHEETS—SHEET 2.
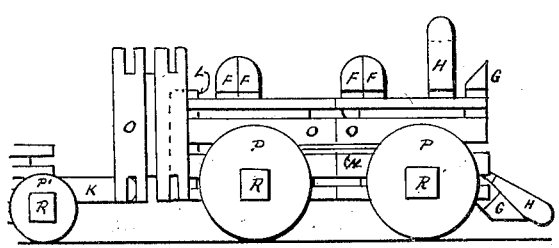
Fig. 18.
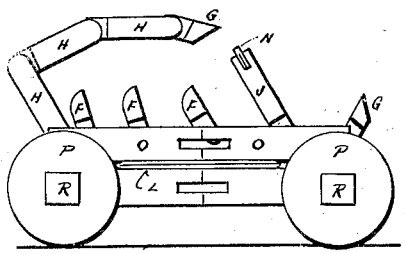
Fig. 19.
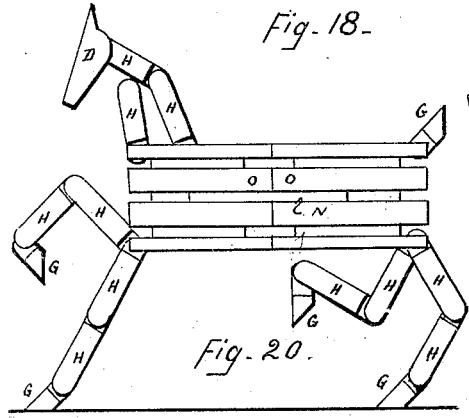
Fig. 20.
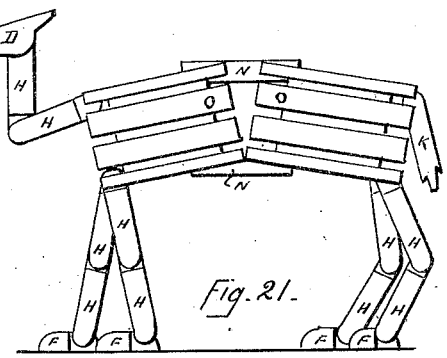
Fig. 21.
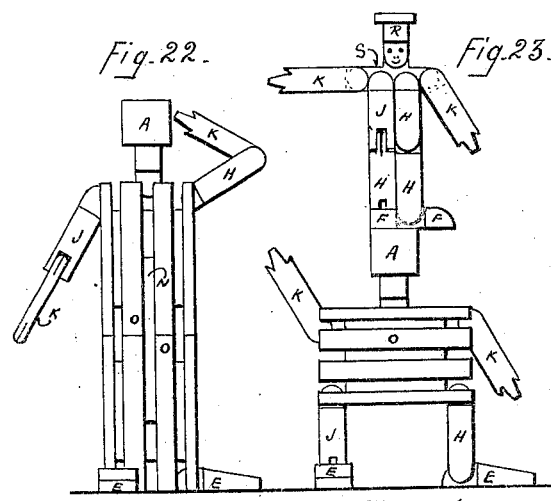
Fig. 22.  Fig. 23.  Fig. 24.  Fig. 25.
Fig. 26.
INVENTOR
George C. Gillespie
BY
ATTORNEY

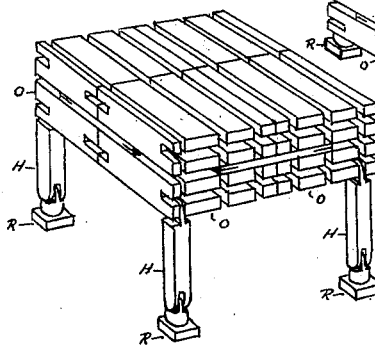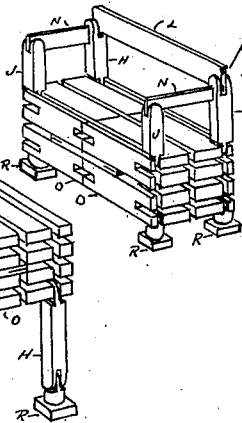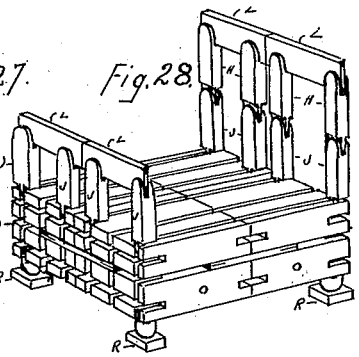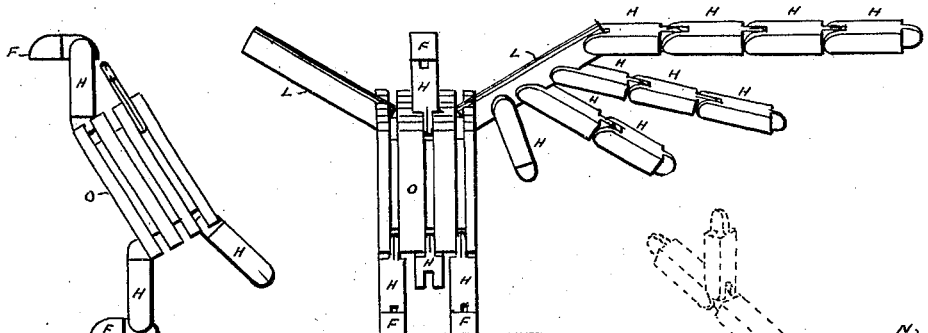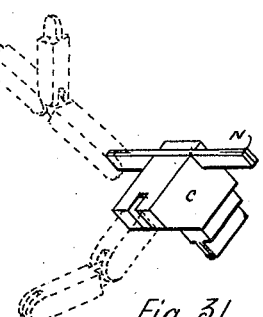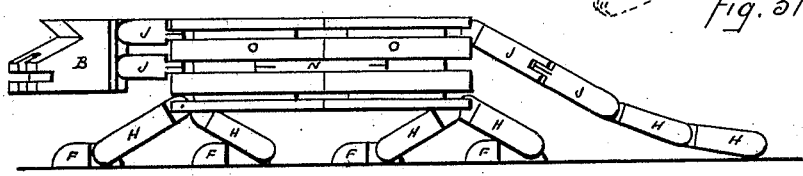

UNITED STATES PATENT OFFICE.

GEORGE C. GILLESPIE, OF GREAT KILLS, NEW YORK, ASSIGNOR TO GILLESPIE MANUFACTURING CORPORATION, A CORPORATION OF NEW YORK.

TOY.

1,370,303. Specification of Letters Patent. Patented Mar. 1, 1921.

Application filed June 2, 1919. Serial No. 301,254.

*To all whom it may concern:*

Be it known that I, GEORGE C. GILLESPIE, a citizen of the United States, residing at Great Kills, in the county of Richmond and State of New York, have invented a new and useful Improvement in Toys, of which the following is a specification.

This invention relates to that class of toy which consists of a number of wooden blocks of various designs, provided with tongues and grooves for assembling together in the formation of animals and objects in caricature; and my improvement comprises a minimum number of different shaped pieces or units for the construction of a maximum or practically unlimited number of articulated forms as fancy may conceive.

As an example of my invention I may, by the employment of seventeen different pieces, produce therewith representations of men, women, all species of animals, wagons, sleighs, automobiles, furniture, buildings, bridges, etc., etc., which can be imitated in so faithful a manner as to leave little, if any, doubt as to the nature of the object or structure intended.

My invention consists primarily in the form or configuration of each separate part or piece in a group, whereby such single pieces, assembled in different combinations, are caused to successfully represent entirely different objects or functions, and my invention further comprehends the provision of tongues and grooves upon the pieces, to provide a movable, practical, stiff and wear compensating union between the said pieces irrespective of the number of times they are assembled and disassembled. This latter object I attain by making the tongues or tenons somewhat thicker than the grooves or mortises, and in providing a compensating slit in the tongues and grooves or in either of them; and in rounding or beveling the tips of the tongues or the sides of the grooves, to facilitate the fitting of a tongue in a groove through elastic compression or expansion of the slit, as the case may be. I prefer to provide the slit in the tongue, as, being thinner than the part that is grooved, it furnishes greater elasticity, while having sufficient stiffness and permanency to answer all practical purposes. Where it is desired that an object or special toy shall have greater permanency than that due to the mere spring or frictional contact between a tongue and a groove or mortise, I provide a wooden or metal taper drift pin, passing through corresponding holes in both tongue and grooved parts, said pins being readily removable when it is desired to use the parts for other structures. This permits a child to make or have made for him a vast variety of permanent toys, from a given set of blocks.

Referring to the drawings, Figures 1 to 17 illustrate the several forms of pieces which I employ and Figs. 18 to 31 illustrate some of the varied structures which may be built by the use of the said pieces.

In Fig. 1, piece A is a cube with a neck $a$ and a tongue $a^1$ projecting from one of its sides, said piece representing a head for a man, woman or monkey; the steam chest or smoke-stack of a locomotive, etc., etc.

In Fig. 2, piece B is formed with a nose or snout $b$, ears $b^1$, mouth $b^2$ at one end, and a neck $b^3$, and tongue $b^4$ at its other end; and may represent the head of a dog, pig, bear, lion, etc., etc.

In Fig. 3, piece C is a block formed with nose or snout $c$, two grooves $c^1$, $c^2$, a neck $c^3$, and tongue $c^4$, as shown, and may represent the head of an elephant, cow, deer, buffalo, etc., the covered top for baby carriage, automobile, locomotive, cab, etc., etc.

In Fig. 4, piece D is formed with a nose or snout $d$, ears $d^1$, and an inset tongue $d^2$ as shown, and may represent the head of a horse, kangaroo, giraffe, dog, etc.

In Fig 5, piece E is a broad, flat, somewhat tapered piece formed with a tongue $e$ on one end, and may represent a foot of a man, woman or animal, etc., etc.

In Fig. 6, piece F is a short piece formed with quarter round ends, one of which is a tongue $f$, and may represent the foot of a dog, bear, lion etc., the head lights for automobiles, locomotives, etc., etc.

In Fig. 7, piece G is a short piece with one end $g$ beveled (formed by making an angular cut through a double tongued piece) and provided with a tongue $g^1$ on one end, and may represent a foot for hoofed animals, as horses, pigs, cows, giraffes etc., the bobbed tail of a horse, deer, etc., etc.

In Fig 8, piece H is a straight four sided piece with rounded ends, one provided with a tongue $h$, and the other with a groove or mortise $h^1$, both in the same plane, to be used in forming arms and legs of men, animals, and general structure members of numerous objects. A tapered pin $h^3$, shown in this figure may be fitted into hole $h^2$ to more securely hold the pieces H together.

In Fig. 9, piece J is similar to piece H except that the slot or groove $j$ is at right angles to the tongue $j^1$, which permits a change in the direction of angles when joined with other parts.

In Fig. 10, piece K is a piece of the thickness of a tongue throughout its length, both ends thereof answering the purpose of tongues. These pieces may serve as the fore arms of men and women as well as for a connecting link between any two slotted pieces.

In Fig. 11, pieces L and M are also thin members, wider than piece K, with the tongue portion on their sides as well as on their ends, and these pieces are for general union between other slotted members.

In Fig. 12, piece N is also a thin and narrow member with the tongued portion on only one side and both ends for purposes similar to those of pieces L and M, as well as to form a flush union between two or more body parts.

In Fig. 13, piece R is formed with one square end abutting a cylindrical portion which terminates in a tongue $r$, the cylindrical portion being somewhat longer than the dimensions of the holes in pieces P, P', so that when fitted therein they serve as hub and axle for wheeled vehicles; and also serve as short legs to furniture, elephant's feet and for numerous uses where analogy permits, etc., etc.

In Fig. 14, piece O is an oblong, cubical piece or prism, provided with grooves $o$ on all of its six sides as shown, to which may be attached any member, provided with a tongue, and a number of said pieces O may be secured together, end to end or side to side, by inserting separate tongue members, like K, L, M or N into said grooves. This piece forms a body portion for men, women, animals, automobiles, wagons, furniture and all general structures.

In Figs. 15 and 16, pieces P and P¹ are circular disks of different sizes, provided with a hole in the center, to serve as wheels for wheeled vehicles, etc., etc.

In Fig. 17, piece S is a thin flat disk of cardboard or metal, somewhat thicker than slits $s$ shown as provided in the tongues of the other pieces, and intended for use in the union of two or more tongues without the use of a grooved or mortised piece.

In the putting together of some of the before named pieces the fancy of the user will indicate a great variety of objects that can be represented or caricatured, but some typical examples are herein illustrated as some aid to the imagination.

Thus, in Fig. 18 a locomotive is shown as represented by the association of pieces O, connected by tenons L, N, and having cardinal elements of locomotive structure, represented by suitable pieces whose tongues are fitted in the grooves of said pieces O. Similarly, in Fig. 19, pieces O represent an automobile body, with its wheels, hood, seats, windshield and headlights all appropriately represented by suitable pieces.

In Fig. 20, a horse is represented. Here it will be obvious that various, angular relations of the parts may be indicated and changed at will to show changed attitudes of the legs, head, tail, etc. This applies particularly to the animate representations. For a camel, by way of example, the pieces O, in Fig. 21, are arranged in angular relation, to represent the peculiar body formation of that animal.

Figs. 22 to 25 show different specimens of human figures, in squat, long and other forms.

In Fig. 26 a table is shown, a couch in Fig. 27 and a bed in Fig. 28.

Fig. 29 gives both side and front views of a bird; Fig. 30 an animal such as a tiger, and Fig. 31 a head portion of an animal which may be fitted with other pieces to represent the head as that of a cow, an elephant, or a stag.

Since the tongues of the different pieces fit in the grooves of other pieces, it is left to the creative ingenuity of the builder to adjust the angular relation that is to be set in the fitting to give the desired effect, it being realized that the pieces will fit together with tensional friction because the tongues, being oversize, and having the slits $s$ to render them compressible, will thereby tightly adhere within the grooves, and have no liability to fall apart or become disjointed. At the same time said pieces may be readily shifted to alter their angular relation, and the structures formed may also be conveniently dismembered.

I have shown in connection with the piece H the tongue and the grooved portion thereof as having holes $h^2$ to receive a pin $h^3$, and it will be readily understood that any others or all of the pieces may be similarly provided to permit the structures to be more permanently joined together.

Instead of, or in addition to the slits $s$ in the tenons or tongues of the pieces or units, I may provide slits $t$ extending inwardly from the grooves formed in said pieces or units, as shown, for instance, in Fig. 8, whereby the walls of a groove are better able to yield or expand for the introduction of an oversized tongue or tenon into said groove, to in this manner accord greater flexibility to the groove, so that it may more readily receive the tongue or tenon and grip it with elastic tension.

Variations may be resorted to within the spirit and scope of my said invention and parts thereof used without others.

I claim:—

1. A multi-unit toy comprising a set of pieces including a body piece and a variety of pieces having different unique profiles, said variety of pieces being selectively and removably engageable with any surface portion of said body piece and with each other for the production of distinct assembled structures representative of either animate or inanimate objects.

2. A variable toy comprising a set of pieces including a body piece and a variety of adjunctive multiple pieces having different unique profiles, said body piece and adjunctive pieces having mutually engageable means whereby said adjunctive pieces may be adjustably extended from any surface portion of said body piece for the production of assembled structures representative of animate or inanimate objects.

3. A variable toy comprising a set of pieces including a body piece and a variety of adjunctive multiple pieces having different unique profiles, said body piece and adjunctive pieces having mutually engageable means whereby said adjunctive pieces may be adjustably extended from any surface portion of said body piece, and from each other, for the production of assembled structures representative of animate or inanimate objects.

4. A multi-unit toy comprising a set of separate pieces each having a tenon and groove whereby said pieces may be removably connected, the tenons characterized by each having a slit to render it compressible in an undersized groove, for tensional adhesion.

5. A multi-unit toy comprising a set of separate pieces each having a tenon and groove whereby said pieces may be movably and removably connected, the tenons characterized by each having a slit to render it compressible in an under-sized groove, for tensional adhesion.

6. A multi-unit toy comprising a set of separate pieces each having a tenon and groove whereby said pieces may be removably connected, the grooves characterized by each having a slit to render it expansible by an oversized tenon, for tensional adhesion.

7. A multi-unit toy comprising a set of separate pieces each having a tenon and groove whereby said pieces may be movably and removably connected, the grooves characterized by each having a slit to render it expansible by an oversized tenon, for tensional adhesion.

8. A multi-unit toy comprising a set of separate pieces each having a tenon and groove whereby said pieces may be removably connected, the tenons characterized by each having a slit to render it compressible by an undersized groove, for tensional adhesion, and thin flat pieces to fit within said slits for connecting the tenons of different units.

9. A multi-unit toy comprising a body piece having grooves, a number of separate pieces each having a tenon, and other separate pieces each having a tenon and a groove, whereby tenoned pieces may be removably connected with grooved pieces, the tenons characterized by each having a slit to render it compressible in an undersized groove for tensional adhesion.

10. A multi-unit toy comprising a body piece having grooves, a number of separate pieces each having a tenon, and other separate pieces each having a tenon and a groove, whereby tenoned pieces may be removably connected with grooved pieces, the grooves characterized by each having a slit to render it expansible by an oversized tenon, for tensional adhesion.

In testimony whereof, I have signed my name to this specification in the presence of two subscribing witnesses, this 28th day of May, 1919.

GEORGE C. GILLESPIE.

Witnesses:
 F. W. BARKER,
 RUTH MIKOLA.